United States Patent
Backman

(10) Patent No.: US 7,124,322 B1
(45) Date of Patent: Oct. 17, 2006

(54) SYSTEM AND METHOD FOR DISASTER RECOVERY FOR A COMPUTER NETWORK

(75) Inventor: Drake Backman, Orem, UT (US)

(73) Assignee: Novell, Inc., Provo, UT (US)

( * ) Notice: Subject to any disclaimer, the term of this patent is extended or adjusted under 35 U.S.C. 154(b) by 660 days.

(21) Appl. No.: 10/252,551

(22) Filed: Sep. 24, 2002

(51) Int. Cl.
*G06F 11/00* (2006.01)

(52) U.S. Cl. .......................... 714/15; 714/20
(58) Field of Classification Search ............... None
See application file for complete search history.

(56) References Cited

U.S. PATENT DOCUMENTS

| | | | | |
|---|---|---|---|---|
| 5,469,573 | A * | 11/1995 | McGill et al. ............... | 717/127 |
| 5,485,606 | A | 1/1996 | Midgdey et al. ............ | 395/600 |
| 5,713,024 | A * | 1/1998 | Halladay .................... | 717/168 |
| 5,778,395 | A * | 7/1998 | Whiting et al. ............. | 707/204 |
| 5,958,062 | A * | 9/1999 | Komasaka et al. ............ | 714/1 |
| 6,016,553 | A * | 1/2000 | Schneider et al. ............ | 714/21 |
| 6,073,128 | A | 6/2000 | Pongracz et al. ............. | 707/3 |
| 6,173,417 | B1 * | 1/2001 | Merrill ........................ | 714/15 |
| 6,405,325 | B1 | 6/2002 | Lin et al. ...................... | 714/15 |
| 6,535,998 | B1 * | 3/2003 | Cabrera et al. ............... | 714/15 |
| 6,543,004 | B1 * | 4/2003 | Cagle et al. .................. | 714/15 |
| 6,625,625 | B1 * | 9/2003 | Kihara et al. ................ | 707/204 |
| 6,728,711 | B1 * | 4/2004 | Richard ........................ | 707/9 |
| 6,865,655 | B1 * | 3/2005 | Andersen .................... | 711/162 |
| 6,901,493 | B1 * | 5/2005 | Maffezzoni .................. | 711/162 |
| 6,931,558 | B1 * | 8/2005 | Jeffe et al. .................... | 714/15 |
| 6,934,881 | B1 * | 8/2005 | Gold et al. .................... | 714/15 |
| 2002/0147733 | A1 * | 10/2002 | Gold et al. .................. | 707/200 |
| 2003/0126242 | A1 * | 7/2003 | Chang ........................ | 709/222 |

OTHER PUBLICATIONS

Microsoft Press Computer Dictionary Third Edition, "directory", Microsoft Press, 1997, p. 148-149.*
Microsoft Press Computer Dictionary Third Edition, "hard disk", Microsoft Press, 1997, p. 226.*
Microsoft Press Computer Dictionary Third Edition, "installation program", Microsoft Press, 1997, p. 253-254.*
Microsoft Press Computer Dictionary Third Edition, "Preferences", Microsoft Press, 1997, p. 377.*

* cited by examiner

*Primary Examiner*—Gabriel L. Chu
(74) *Attorney, Agent, or Firm*—Pillsbury Winthrop Shaw Pittman, LLP

(57) ABSTRACT

A system and method for disaster recovery for a plurality of computers on a computer network including creating a first image of base system data for restoring the base system of a plurality of workstations of a computer network, storing the first image on computer media, creating one or more second images application data for restoring one or more applications of the plurality of workstations on the computer network, storing the second image on computer media, creating a third image of personalized data relative to a respective workstation on the computer network and storing the third image on computer media.

42 Claims, 3 Drawing Sheets

SYSTEM AND METHOD FOR DISASTER RECOVERY FOR A COMPUTER NETWORK

BACKGROUND OF THE INVENTION

1. Field of the Invention

This invention relates to systems and methods for disaster recovery for computer systems and more particularly to systems and methods for backing up a workstation on a computer network and restoring local data to the workstation in the event of a system crash (i.e., disaster recovery).

2. Background

The contents of the data of a computer may be destroyed or become unavailable by the user's operation of the computer or by a breakdown in the storage device (hard disk crash). The loss of data results in significant damage in terms of time, money and other resources. To minimize damage, backup systems and software have been developed which make a complete copy of the data on a user's hard drive. The backups of the data are done usually at a predetermined time, and generally require the computer to execute an application program to accomplish the backup. Thus, in the event of hard drive failure, the data may be copied back from the backup via an application program.

Generally, there are two current methods of backing up a computer: backing up files (backup using computer media such as a CD-RW or magnetic tape) or drive imaging. Backing up files copies the files onto another medium one by one (in an original or compressed form). Backup are usually performed at the end of a user session after a predetermined period of time or event (e.g., daily, weekly, monthly, sales period, after placement of purchase orders, etc.).

Although backup methods are usually very complete in making a copy of the files on the old hard drive, the restore process is slow and requires the user to first format and/or partition the hard drive, reinstall the operating system software, install the system registry information and install the "restore" application program. Thereafter, using the restore program, the user may then copy the backup files from the backup media to the hard drive. However, it is likely that applications need to be reinstalled from their original installation disks since backup copies of such software rarely works reliably. Thus, although file backup methods make excellent full copies of files for disaster recovery, the restore process makes it somewhat tedious and difficult to use.

Moreover, file backup methods take up a great deal of system resources for a computer network that needs files on all workstations to be backed up.

Alternatively, drive imaging enables a user to image their entire hard drive bit by bit, making an exact duplicate of the drive. The image is obtained, however, with the use of an imaging application in which the computer is separately booted (generally with a separate boot diskette) to run an imaging application. Moreover, to restore the drive, the user boots the computer (with a separate diskette generally) into a restoring environment (restore application), which then copies the image back from the separate media upon which the image is stored to the hard drive, which completely restores the drive to its original condition.

However, imaging the drives of all the workstations of an entire network still takes considerable resources and memory storage. Since the storage space requirements and the intrusive nature of the image creation process, imaging has never been considered a viable alternative to backing up and restoring data from individual computers. Accordingly, there exists a need for disaster recovery which addresses the above noted drawbacks of the current backup and restore methods and systems.

SUMMARY OF THE INVENTION

The present invention solves the above problems and presents a novel invention which images the data of workstations in an efficient manner. Specifically, the contents of the hard drives for workstations on a computer network are uniquely imaged in an efficient manner.

The present invention provides a fast, non-intrusive backup and restore process. Specifically, the backup process according to the embodiments of the present invention is as fast and as non-intrusive as tape-backup processes, and the restore process is as fast as imaging processes, yet is fully customizable as tape backups.

The present invention also includes the advantages of being able to restore a disconnected workstation completely, provided the necessary image files are available on media capable of being used with the disconnected workstation (e.g., CD-ROM).

Backup and restore policies for the network of workstations may be customized by administrative personnel in a network directory (e.g., e-Directory® with Zenworks by Novell). The policies determine which files and directories are placed in backup images, and determine how often backup images are created. Moreover, the backup imaging operates as an independent background process on a workstation with the images being stored on a file server of the network (or even on a remote server via, for example, the internet).

Accordingly, in one embodiment of the present invention, a method for disaster recovery for a plurality of computers on a computer network includes creating a first image of base system data for restoring the base system of a plurality of workstations of a computer network, storing the first image on computer media, creating a second image of application data for restoring at least one application of the plurality of workstations on the computer network, storing the second image on computer media, creating a third image of personalized data relative to a respective workstation on the computer network and storing the third image on computer media.

Another embodiment of the present invention, includes the same process as outlined in the previous embodiment and also includes restoring the base system data with the using the first image, restoring the application data using the second image and restoring the personalized data using the third image. Restoring of the various data occurs generally in the event of a disaster.

Another embodiment of the present invention includes a computer program product and/or computer readable media having computer instructions for performing a method for disaster recovery according to the previous embodiments.

Yet another embodiment of the present invention includes a system for performing a method for disaster recovery for a plurality of computers on a computer network including first creating means for creating a first image of base system data for restoring the base system of a plurality of workstations of a computer network, first storing means for storing the first image on computer media, second creating means for creating a second image of application data for restoring at least one application of the plurality of workstations on the computer network, second storing means for storing the second image on computer media, third creating means for creating a third image of personalized data relative to a respective workstation on the computer network and third storing means for storing the third image on computer media.

In another embodiment of the present invention, using the system according to the previous embodiment and also including first restoring means for restoring base system data of a respective computer, second restoring means for restoring application data of the respective computer and third restoring means for restoring personalized data of the respective computer. Data is restored in the event of a disaster.

In still yet another embodiment of the present invention, a method for restoring data on a workstation on a computer network includes booting the workstation into a restoring environment, restoring base system data to the workstation, restoring application data to the workstation and restoring personal data.

These and other objects, features, and advantages of the invention will be apparent through the detailed description of the embodiments and the drawings attached hereto. It is also to be understood that both the foregoing general description and the following detailed description are exemplary and not restrictive of the scope of the invention.

BRIEF DESCRIPTIONS OF THE DRAWINGS

Numerous other objects, features and advantages of the invention should now become apparent upon a reading of the following detailed description when taken in conjunction with the accompanying drawings, in which.

DETAILED DESCRIPTION OF THE EMBODIMENTS

Figure 1:
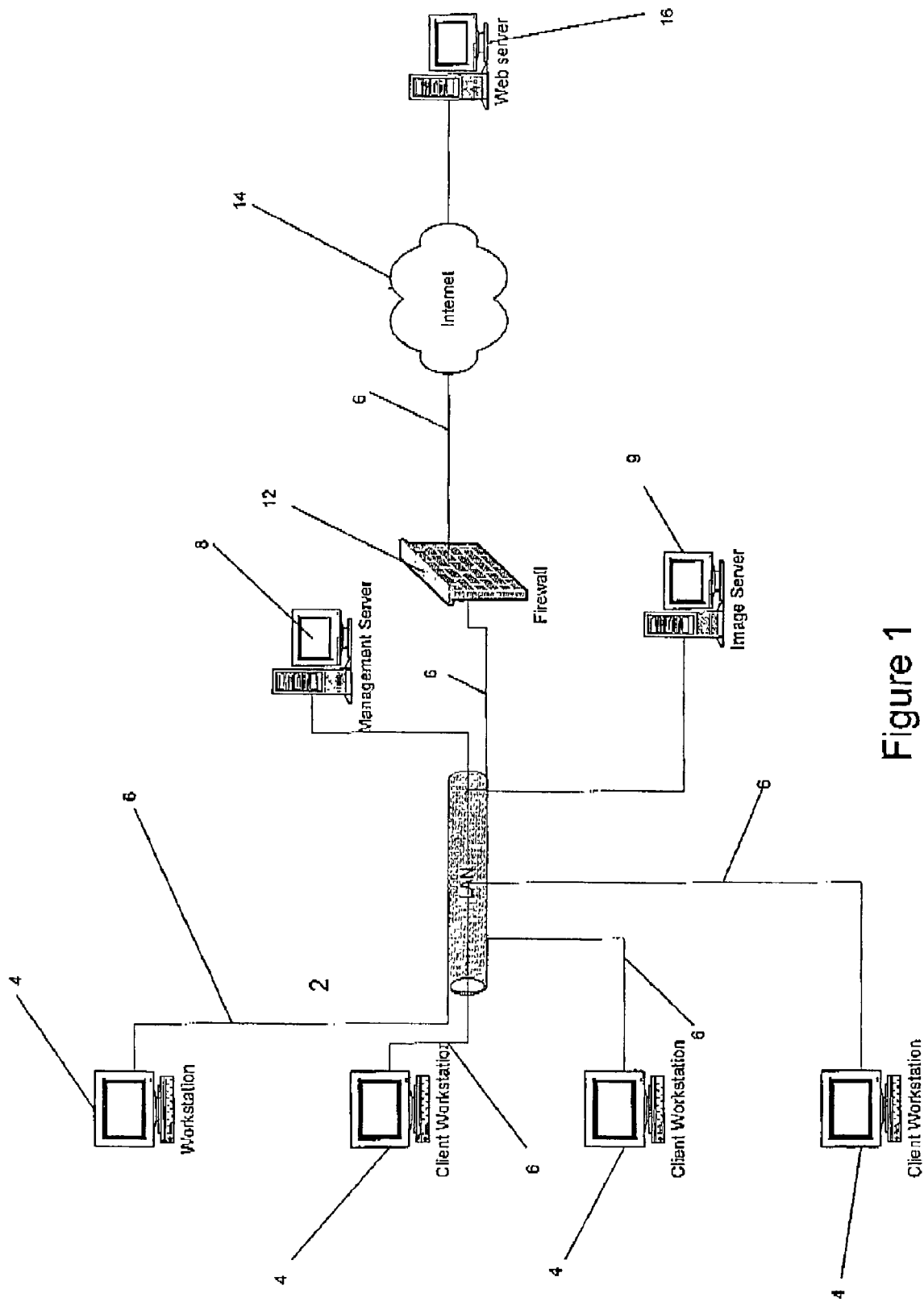
FIG. 1 illustrates a local-area network having a disaster recovery system and process according to one embodiment of the present invention.

As shown in FIG. 1, the present invention is used in conjunction with, for example, a Local Area Network (LAN) 2. Accordingly, a plurality of workstation workstations 4 are in communication with the LAN via communication channels 6. The communication channels may include at least one or several forms of available data transfer including wire cable, optical cable, and wireless technologies. Thus, one workstation may be connected via wireless data transfer, and another device of the network (e.g., a server) may be connected via an optical transfer means, for example.

The LAN may be in communication with remote servers 16 via the internet 14. Accordingly, a firewall 12 is preferably used to stop unapproved access to LAN.

Figure 2:
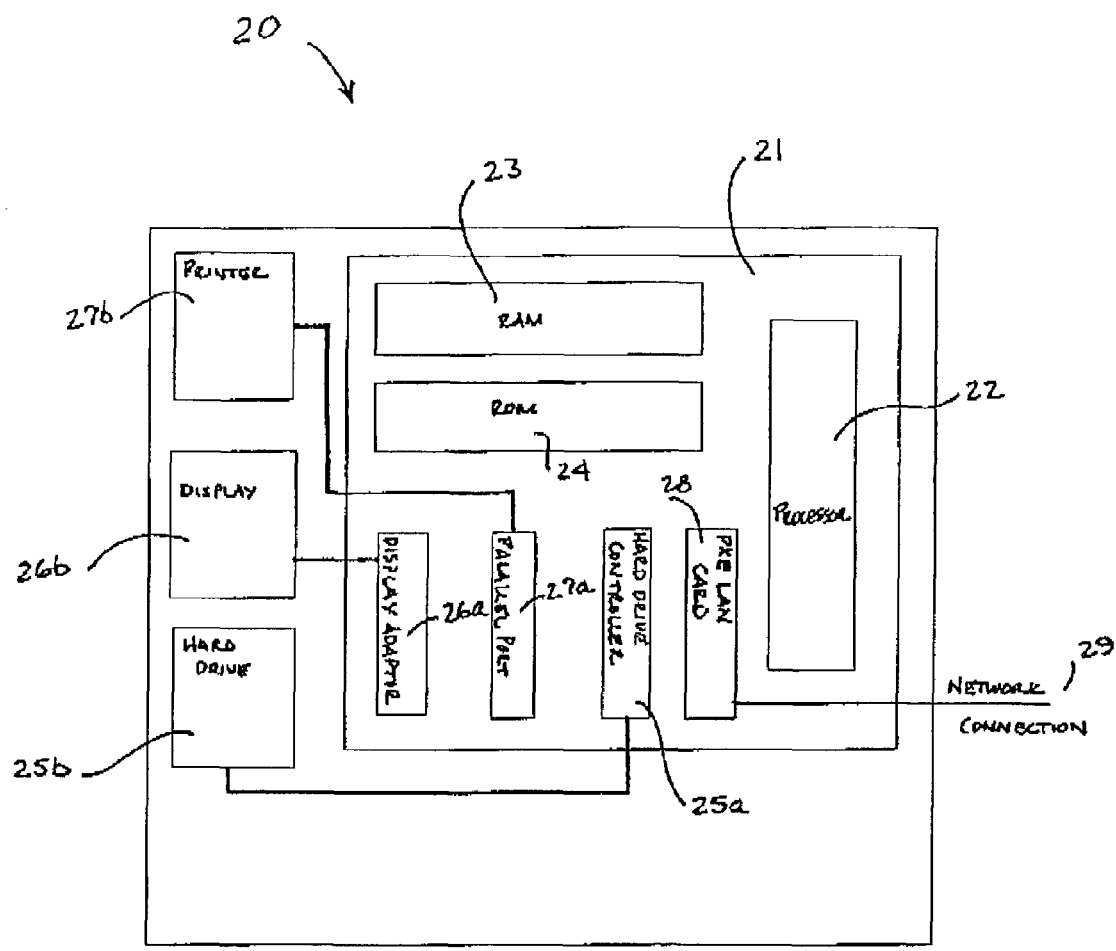
FIG. 2 illustrates an overview of a workstation according to one embodiment of the present invention.

As shown in FIG. 2, a workstation 20 which may be used with the present invention generally includes a motherboard 21 having a processor 22, along with RAM memory 23, and ROM memory 24. The motherboard also generally includes controller hardware for controlling associated and peripheral devices including a hard drive controller 25a for controlling hard drive 25b, display controller (adapter) 26a for controlling a display 26b, and a parallel port 27a for controlling a printer 27b. The workstation 20 also may include a PXE-enabled hardware configured to be used as a boot mechanism. Accordingly, the PXE-enabled hardware may include a LAN card 28 with a PXE BIOS inserted in, for example, a PCI slot on the motherboard. The LAN card allows the workstation to communicate with the LAN and internet via a network connection 29 (i.e., fixed line or wireless). One of skill in the art will appreciate that the processes performed by the PXE hardware may be performed by software operated on the workstation upon starting the workstation.

In one embodiment of the present invention, data is backed up through an imaging process during normal operation of the workstation, preferably as an application operating in the background. The imaging application may be a Windows® service, or a chronological job in a Unix® environment, although, any job that may be launched at specific intervals or at specific times without user intervention may be used in the present invention.

As stated earlier, the present invention preferably divides data into baseline data, application data, and personal data. Baseline data generally includes the operating system data, disk partition data and device driver data. Application data generally includes the application program data and other executable programs used on workstations. Personal data is any data that a user of the workstation (or alternatively or in addition to) data unique to the individual workstation (system settings, preferences, personal files). The data images are preferably stored on an Image Server 9 (FIG. 1) provided on the LAN, however, the images may be stored on any network and external server 16 (provided over, for example, the internet 14 via firewall 12 and communication lines 6), and may also be stored on network and local, recordable media drives (e.g., CD-RW, Jaz® drive, Zip® drive, and the like).

Figure 3:
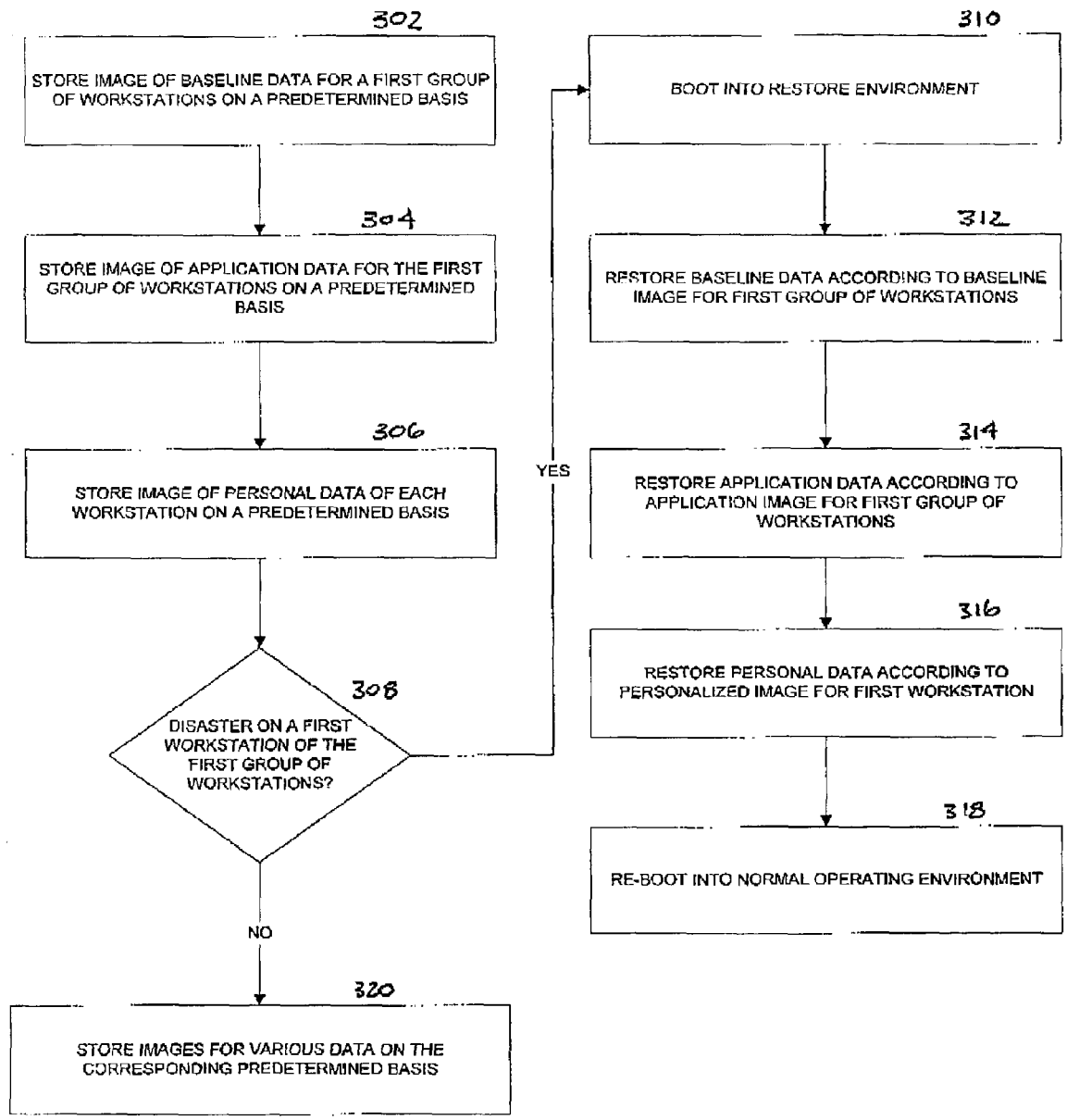
FIG. 3 illustrates a flow diagram for disaster recovery according to the present invention.

Accordingly, images are stored for specific corresponding data according to steps 302–320 as shown in FIG. 3. That is, an image for each of the baseline data, application data and personal data are created and stored either on a network server, a remote server, or removable media (either local, but preferably on a network or remote server)(see steps 302–306, FIG. 3). If a disaster occurs (308), then the workstation is booted into a restore process (310–318). During normal operation, images are re-created and stored in a predetermined manner as outlined below (320).

It is a feature of the present invention that preferably, only a few copies (less than the number of workstations on the network), and more preferably only a single image of baseline data common amongst several workstations, a group of workstations or all the workstations of the network is stored for disaster recovery. A single or limited number of images for the baseline data saves network resources (e.g., system memory media or otherwise), such that only a fraction of the media storage is necessary to image the baseline data for all the workstations on the network.

In one embodiment of the present invention, the baseline image merely restores an installation program for installing operating system and/or other baseline data, by accessing the installation data from a network server. However, since most workstations operate under the same operating system, the baseline image preferably is the image of the operating system which is fully restored during the restore process.

It is yet another feature of the present invention that only a few copies (less than the number of workstations on the network) of an image of the application data common amongst several workstations, a group of workstations or all the workstations of the network are stored for disaster recovery. Even more preferable, only a single image of the application data, or preferably, a data image for each application program is stored for a group of workstations to save system resources (as with the saved images of the baseline data discussed above). Thus, as with the baseline data, using a single or a limited number of images for a plurality of workstations on a computer network uses only a small percentage of media as compared to having to save images of application data for each workstation.

The application image in the present invention is data associated with establishing an install application program for each of the one or more applications which were part of the affected workstation being restored. Preferably, however, an application image may be data for a full, installed state, version of an application.

Next, personalized images for each workstation are imaged and the images saved (as with the baseline and application images). Personalized data for each workstation is separately imaged since, generally, this data varies from workstation to workstation. The contents of the Personal Data Image may not be defined exactly, but may be considered to be any personal data or settings the user wishes restored in the event of a disaster. Such definitions may be defined by network administrators of the computer network.

Since several workstations, or a group of workstations may include a different operating system and/or different application data, and disk partitions, separate image data for those groups of workstations is preferably stored. Thus, workstations are generally grouped so that data common between them is imaged preferably a single time Storing only (preferably) a single image for data common to a plurality of workstations on the network takes up considerably less file space then separately imaging such data for each workstation. Not only are network resources spared from redundant storage of information, but such data need only be imaged when the baseline data is newly installed or updated on the network.

The single image of the baseline data and the single image of the application data may be imaged from any one of the workstations which share the same baseline data and application data. Thus, network policies may determine that the same workstation in the network is used to image the baseline and application data, or the policies may determine that a random workstation of the network be imaged. Accordingly, one skilled in the art will appreciate that the systems and methods for determining whether data has been upgraded or changed may be used to determine when to image the various data for the workstations.

The images for the baseline and application data preferably only requiring updating if the corresponding operating system, disk partitions and application data are changed. For example, if programs associated with the operating system or applications of the workstations have been upgraded, then a new image would generally be required. Similarly, if a new application is added to workstations on the network, then the application image would also require updating.

Thus, since preferably on a single (or perhaps several) image of the baseline data and application data of a group of workstations is required to be imaged, only one of the group of particular workstations would require imaging for the baseline and application data.

With regard to the personalized data, generally (dependent upon network policies) the individual workstations would be imaged on a predetermined, ongoing basis. Thus, a schedule of imaging may be established where an image of the personalized data may occur once day, once every other day, once a week, and the like. Since personalized data most likely will be changed on a daily basis, the personal data would preferably be imaged once a day. Of course, as mentioned earlier in the application, the imaging process may be accomplished by an imaging application operating in the background during normal use of the workstation.

Alternatively, a server or workstation based application program could compare the file/directory structure of a workstations hard drive to determine if personalized data has been changed. If information has been upgraded or changed, a new personalized data image may be performed.

The images for the various data according to the present invention are preferably stored on a network server, but may also be stored on a remote server on a different network (e.g., WAN, the internet, and the like), on either another hard drive, a CD, or other recordable media including microchip memory (e.g., compactflash, smartmedia and the like). Of course the personalized images for each workstations may also be stored locally, but of course must not be stored on the same hard drive being imaged.

Images for each of the data outlined above may also be separately stored according to a disk partition. Thus, if only a particular partition needs to be recovered, then the image associated with that partition is required. Accordingly, one embodiment of the present invention includes imaging each disk partition for baseline data and/or application data and/or personalized data for the group of workstations (e.g., a single or several images for the group with regard to baseline and application data and an image of personalized data for each workstation of the group).

Restoration of a workstation's hard drive in the event of a hard drive crash (disaster recovery) in the present invention preferably is performed as follows. For the present invention, a disaster may be defined as any massive data loss or failure of the computer or hard drive.

The workstation is preferably booted into a restoring environment. This may be done via, for example, CD, diskette, an installed partition or via PXE the polices of which may be determined by network administrators. The data is then preferably restored by restoring the baseline data, including at least the operating system and any disk partitions, using the baseline data image. Thereafter, application data is restored using the image associated with the application data, and then personal data from the individual personal data image of the particular workstation being restored.

Once all the data (baseline, application, personal) has been restored to the workstation, it is rebooted and returned to the condition it was in prior to the workstation crash (disaster).

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto. Any contents of references, issued patents, and published patent applications cited in this application are hereby incorporated by reference. The appropriate components, processes, and methods of those patents, applications and other documents may be selected for the present invention and embodiments thereof.

What is claimed is:

1. A method for disaster recovery for a plurality of workstations on a computer network comprising:
   grouping workstations of the computer network having a common base system into a first group of workstations;
   determining, based on one or more network policies, a first workstation from the first group of workstations for imaging the common base system;

creating a first image of base system data from the determined first workstation, for restoring the common base system of the workstations of the first group;

storing the first image on computer media;

determining a first set of workstations in the first group of workstations having a common application program;

determining, based on the one or more network policies, a second workstation from the first set of workstations for imaging the common application program;

creating a second image of application data from the determined second workstation, for restoring the common application program of the workstations of the first set;

storing the second image on computer media;

creating a third image of personalized data relative to a respective workstation on the computer network; and storing the third image on computer media.

2. The method according to claim 1, wherein in the event of a crash of the respective workstation belonging to the first group and belonging to the first set of workstations, the method further includes restoring the base system data of the respective workstation using the first image, restoring the application data of the respective workstation using the second image and restoring the personalized data of the respective workstation using the third image.

3. The method for disaster recovery according to claim 1, wherein the computer media comprise a server.

4. The method for disaster recovery according to claim 3, wherein the server is local to the computer network.

5. The method for disaster recovery according to claim 3, wherein the server is external to the computer network.

6. The method according to claim 1, wherein the computer media is a disk.

7. The method for disaster recovery according to claim 1, wherein the computer network comprises a Local-Area-Network (LAN).

8. The method for disaster recovery according to claim 1, wherein the computer network comprises a Wide-Area-Network (WAN).

9. The method according to claim 1, wherein the computer network comprises an intranet.

10. The method according to claim 1, wherein the computer network comprises the Internet.

11. The method for disaster recovery according to claim 1, wherein the first image, the second image and the third image are stored on the same server.

12. The method for disaster recovery according to claim 1, wherein the first image, the second image and the third image are each stored on different servers on the computer network.

13. The method for disaster recovery according to claim 1, wherein the first image and second image are stored on the same server.

14. The method for disaster recovery according to claim 1, wherein the first image and the third image are stored on the same server.

15. The method for disaster recovery according to claim 1, wherein the second image and the third image are stored on the same server.

16. The method for disaster recovery according to claim 1, wherein the third image is stored during normal operation of the respective workstation.

17. The method for disaster recovery according to claim 16, wherein an application for performing the storing of the third image operates during normal use of the respective workstation as a background application.

18. The method for disaster recovery according to claim 1, wherein the personalized data comprising the third image is determined by policies provided on an administrative directory on a server of the network.

19. The method for disaster recovery according to claim 1, wherein the first workstation and second workstation are the same.

20. The method for disaster recovery according to claim 1, wherein the first workstation and second workstation are different.

21. A computer readable media storing computer instructions for performing a method for disaster recovery for a plurality of workstations on a computer network comprising:

grouping workstations of the computer network having a common base system into a first group of workstations;

determining, based on one or more network policies, a first workstation from the first group of workstations for imaging the common base system;

creating a first image of base system data from the determined first workstation, for restoring the common base system of the workstations of the first group;

storing the first image on computer media;

determining a first set of workstations in the first group of workstations having a common application program;

determining, based on the one or more network policies, a second workstation from the first set of workstations for imaging the common application program;

creating a second image of application data from the determined second workstation, for restoring the common application program of the workstations of the first set;

storing the second image on computer media;

creating a third image of personalized data relative to a respective workstation on the computer network; and storing the third image on computer media.

22. The computer readable media according to claim 21, wherein in the event of a disaster of the respective workstation belonging to the first group and belonging to the first set of workstations, further comprising computer instructions restoring base system data, application data and personalized data using the first image, the second image and the third image, respectively.

23. The computer readable media according to claim 21, wherein the first workstation and second workstation are the same.

24. The computer readable media according to claim 21, wherein the first workstation and second workstation are different.

25. A system for performing a method for disaster recovery for a plurality of workstations on a computer network comprising:

first grouping means for grouping workstations of the computer network having a common base system into a first group of workstations;

first determining means for determining, based on one or more network policies, a first workstation from the first group of workstations for imaging the common base system;

first creating means for creating a first image of base system data from the determined first workstation, for restoring the common base system of the workstations of the first group;

first storing means for storing the first image on computer media;

second determining means for determining, a first set of workstations in the first group of workstations having a common application program;

third determining means determining, based on the one or more network policies, a second workstation from the first set of workstations for imaging the common application program;

second creating means for creating a second image of application data from the determined second workstation, for restoring the common application program of the workstations of the first set;

second storing means for storing the second image on computer media;

third creating means for creating a third image of personalized data relative to a respective workstation on the computer network; and third storing means for storing the third image on computer media.

26. The system according to claim 25, further comprising first restoring means for restoring base system data of the respective workstation, second restoring means for restoring application data of the respective workstation and third restoring means for restoring personalized data of the respective workstation, wherein data is restored in the event of a disaster.

27. The system according to claim 26, wherein the first restoring means, the second restoring means and the third restoring means comprise a common restoring means.

28. The system according to claim 25, wherein the first creating means, the second creating means and the third creating means comprise a common creating means.

29. The system according to claim 25, wherein the first storing means, the second storing means and the third storing means comprise a common storing means.

30. The system according to claim 25, wherein the first workstation and second workstation are the same.

31. The system according to claim 25, wherein the first workstation and second workstation are different.

32. A method for restoring data on a workstation belonging to a first group of workstations on a computer network wherein the workstations of the first group have a common base system and at least one common application program, the method comprising:

grouping the workstation into the first group of workstations;

booting the workstation into a restoring environment;

restoring base system data to the workstation according to the common base system for the first group of workstations, wherein the base system data is imaged from a first workstation of the first group;

restoring application data to the workstation according to the common application program for the first group of workstations, wherein the application data is imaged from a second workstation of the first group; and restoring personal data to the workstation according to personalized data relative to the workstation.

33. The method according to claim 32, wherein the base system data includes data corresponding to at least one of the operating system, disk partition and device drivers.

34. The method according to claim 32, wherein the application data includes data for restoring installation routines and executable applications.

35. The method according to claim 32, wherein the personal data includes a workstation's personal preferences and other personal data.

36. The method according to claim 32, wherein data is restored from data images stored on a server of the computer network.

37. The method according to claim 32, wherein the first workstation and second workstation are the same.

38. The method according to claim 32, wherein the first workstation and second workstation are different.

39. A method for disaster recovery for a plurality of workstations on a computer network, wherein a first group of workstations having a common base system includes at least two of the plurality of workstations and wherein a first set of workstations in the first group have a first common application data and a second set of workstations in the first group have a second common application data, and further where each work station in the first group has personalized data, comprising:

grouping workstations of the computer network having a common base station into the first group of workstations;

determining, based on one or more network policies, a first workstation from the first group of workstations for imaging the common base system;

creating and storing from the determined first workstation a common base system data image for restoring the base system of each of the workstations of the first group of workstations;

determining, based on one or more network policies, a second workstation from the first set of workstations for imaging the first common application data;

creating and storing from the determined second workstation a first common application data image for restoring the first common application of each of the workstations of the first set of workstations;

determining, based on one or more network policies, a third workstation from the second set of workstation for imagining the second common application data;

creating and storing from the determined third workstation a second common application data image for restoring the second common application of each of the workstations of the second set of workstations; and separately creating and storing a personalized data image for each workstation in the first group for separately restoring the personalized data of each workstation of the first group of workstations.

40. The method according to claim 39, for restoring a workstation includes: restoring a workstation in the first group and belonging to one or both of the first set of workstations or second set of workstations, using: i) the common base system data image; ii) at least one or both of the first common application data image and the second common application data image, depending on whether the workstation belongs to one or both of the first set of workstations or the second set of workstations; and iii) the personalized data of the workstation using the personalized data image created for the workstation.

41. The method according to claim 39, wherein the first workstation, second workstation and third workstation are the same.

42. The method according to claim 39, wherein the first workstation, second workstation and third workstation are different.

* * * * *